United States Patent [19]

Weinblatt

[11] 4,383,626
[45] May 17, 1983

[54] TELEVISION VIEWING SUPPORT APPARATUS FOR USE IN AN AUTOMOBILE

[76] Inventor: Lee S. Weinblatt, 797 Winthrop Rd., Teaneck, N.J. 07666

[21] Appl. No.: 251,067

[22] Filed: Apr. 6, 1981

[51] Int. Cl.³ .............................................. B60R 11/02
[52] U.S. Cl. .................................. 224/275; 224/42.42
[58] Field of Search ..................... 224/275, 279, 42.42, 224/42.45 R, 42.43; D34/17; 108/44; 297/191, 188

[56] References Cited

U.S. PATENT DOCUMENTS 2,499,103  2/1950  Love .................................. 224/42.42
2,869,146  1/1959  Allison .............................. 297/191
3,372,896  3/1968  Myers et al. ............................ 248/1
3,873,010  3/1975  Patterson ............................ 224/275

Primary Examiner—Steven M. Pollard
Assistant Examiner—D. Voorhees
Attorney, Agent, or Firm—Thomas Langer

[57] ABSTRACT

An apparatus is disclosed for securely retaining a television set in an automobile for rear seat viewing. The apparatus includes an adjustable platform to support the television set and a holder to accommodate a video tape recorder. In addition, an audio assembly is provided having a rearward facing remote speaker and earphone jacks to provide any level of quiet and privacy desired. The apparatus includes means for readily and removably securing it to the front seat.

3 Claims, 1 Drawing Figure

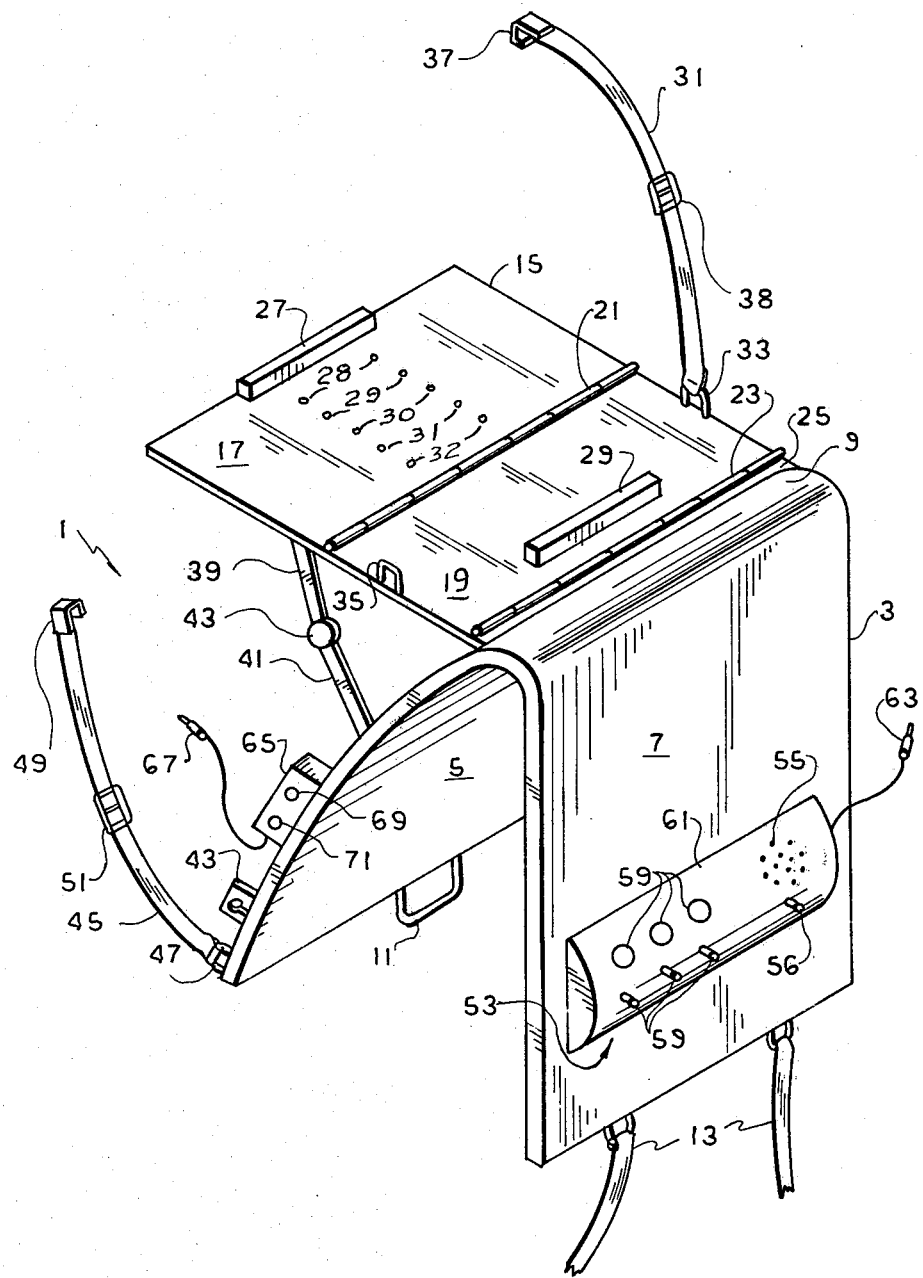

TELEVISION VIEWING SUPPORT APPARATUS FOR USE IN AN AUTOMOBILE

BACKGROUND OF THE INVENTION

This invention is directed to a support apparatus and, more particularly, for supporting a television set (TV) along with associated equipment such as a video tape recorder (VTR) and speaker system for use in an automobile.

It has been found that providing TV viewing for the backseat passenger travelling in an automobile is useful to a number of people in a variety of situations. For example, the busy executive on his way to work in the morning can have the opportunity in his chauffeur driven limousine to get an early start on the news of the day during what might otherwise be an essentially wasted trip. Alternatively, the same executive may want to use the time to view a previously recorded presentation from his VTR. Specially equipped limousines are available with built-in equipment to handle these functions. Another example of a usage to which such equipment can be put is entertainment, particularly on long trips. Since children, and adults, often get bored during long automobile trips, a TV would provide ideal companionship and entertainment. Programs could be plucked off the air in strong reception areas or supplied from a portable VTR carried in the automobile. However, the room available permanently in a limousine is not available in a family automobile to accomodate the necessary equipment. Accordingly, an unsatisfied need exists for a removable support which can conveniently provide the multi-uses required.

SUMMARY OF THE INVENTION

It is the primary object of the present invention to provide a removable TV support for use in a family type of automobile.

It is another object of the present invention to provide a removable TV support for use in a family type of automobile which can be folded out of the way when not in use.

A further object of the present invention is to provide a removable TV support for use in a family type of automobile which can accomodate a VTR along with suitable speaker and headphone units.

Still another object of the present invention is to provide a multi-purpose TV support for use in a family type of automobile which is sturdy, readily installable and removable, relatively inexpensive, and adjustable for viewing height and various sizes of TV's.

To accomplish these and other objects, the present invention is directed to an apparatus having, in the preferred embodiment, a frame shaped to fit on the back of the front seat of an automobile. Attached to the frame is a platform which can be raised to a desired position and on which the TV may rest. A holder for securely retaining a VTR is also available. A choice of listening modes is provided with a rearward facing audio assembly on the frame. A remote speaker is utilized as well as a plurality of earphone jacks. The passengers may, thus, select the mode which satisfies them and does not disturb adjoining passengers. The apparatus is designed with safety in mind by securing those components which might cause injury during an emergency and padding or keeping out of the way those portions which might cause harm should a person impact against them. The fastening means is convenient to thereby facilitate and encourage their use.

BRIEF DESCRIPTION OF THE DRAWING

The FIGURE is a perspective view of the apparatus constructed according to the principles of the present invention.

DETAILED DESCRIPTION OF THE DRAWING

The main element of support apparatus 1 depicted in perspective in the FIGURE is frame 3. Frame 3 is constructed to fit snugly on top of the backrest of a standard automobile-bench-seat (not shown). The front part, 5, slants forward somewhat and is a bit rounded. The back part, 7, is vertical and straight, and the top part, 9, is of course rounded. The preferred location for the support is in the middle of the seat between the driver and front seat passenger. To firmly secure the support in place, a bracket 11 and straps 13 are provided. The middle seat belt, found in most family type automobiles, and in any case easily installable, is passed through bracket 11 and tightened. Also, straps 13 are attached to the seat belt mounts on the rear floor and tightened. Alternatively, special mounts may readily be provided for these straps. With the front and rear sections of support 1 anchored with bracket 11 and straps 13 respectively, the support is snug against the automobile seat and cannot fly off during a quick stop or shift sideways in a sharp turn.

A flat, table-top type of platform, 15, is attached at its rear to top 9 of frame 3. Platform 15 may be comprised of forward section, 17, and rear section, 19, coupled to each other by linear hinge 21. Hinge 21 is of the type which permits section 17 to swing downward but locks it in the 180° position to keep it from swinging in the other direction. Thus, with platform 15 in the horizontal position and supported at both ends, a firm platform is provided which will not collapse when a heavy object is placed on it; so long of course, as its weight tolerance is not exceeded. It is designed to carry a portable TV not exceeding 50 lbs. in weight, but the weight tolerance can easily be modified depending on the sturdiness of the materials used.

Platform 15 is coupled to top 9 of frame 3 by linear hinge 23. Hinge 23 permits free movement in both the up and down directions so platform 15 can be folded down out of the way or tilted up to any angle to facilitate viewing of the TV from the rear seat. Hinge 23 is preferably attached to rearmost section 25 of platform 15. Section 25, in turn, is fixed to top 9 of frame 3 by any conventional technique such as gluing, stitching, stapling, or a combination thereof. The particular method will depend on the material used for the various elements.

Afixed to platform 15 are front and rear stop plates 27 and 29, respectively. Front stop plate 27 includes pins, or dowels (not shown), protruding from its bottom which can be inserted in any combination of holes 28-32 besides the holes (not shown) in which the pins rest in the depicted position. While the position of front stop plate 27 is adjustable, that of rear stop plate 29 is not. The latter is fixed to platform 15 somewhat forward of top 9 of body 3. The positioning of stop plate 27 insures that a belted rear seat passenger will not impact his head on the TV during an emergency stop or a collision.

The adjustability in position of front stop plate 27 permits the accomodation of variously sized TV sets. Some are deeper than others so this feature insures that front and back movement of the TV will be confined. Since the adjustability is finite, some movement may occur but too little to build up substantial momentum. Moreover, strap 31 is provided to firmly secure the TV. Strap 31 is fixed to platform 15 by bracket 33. At the opposite side of platform 15 from bracket 33 is bracket 35. On the free end of strap 31 is a buckle 37 which includes a lip securely insertable in bracket 35 so that when strap 31 is tightened, the lip cannot slide out of bracket 35. Strap 31 also includes an adjusting buckle 38 to customize its length to the particular TV set used. Thus, the combination of stop plates 27 and 29 with strap 31 will prevent any dangerous front and rear, as well as sideways, movement of the TV.

The position of platform 15 may be set by pivotable arms 39 and 41. Arm 39 is connected at one end to platform 15 whereas arm 41 is connected at one end to front portion 5 of frame 3. The other ends of arms 39 and 41, respectively, are coupled to each other via pivot hinge 43. Hinge 43 is detentable to any one of a plurality of latched positions to place platform 15 at a desired angle for TV viewing. Hinge 43 also permits folding of arms 39 and 41 so that platform 15 may be placed out of the way in the automobile as well as for storage. Another identical set of arms 39 and 41 and hinge 43 (not shown) is located on the other side of platform 15 and attached to function in the same manner.

Since a VTR is required at least when the automobile is travelling in poor reception areas, the invention provides a means for conveniently accomodating it and retaining it in position. A slotted holder, 43, is on either side of front portion 5 of frame 3 (one holder 43 only is shown). The female type holder is designed to receive a male type pin found on portable VTR's or readily attachable to a VTR. The enlarged pin head is fitted through the circular portion of the slot and the narrower pin shaft is then slid rearward in the elongated slot. Strap 45, attached to frame portion 5 by buckle 47, similar to buckle 33, secures the VTR in place. Buckle 49, similar to buckle 37, on the free end of strap 45, fits into a bracket (not shown), similar to bracket 35, on the other side of frame portion 5. Adjusting buckle 51, similar to buckle 38, permits varying the length of strap 45 to securely hold the VTR in place. Thus, the combination of holders 43 and buckle 45 functions to prevent unwanted movement of the VTR without interfering with its mechanisms.

Frame portion 7 carries a sound assembly 53 which includes speaker 55, volume control 56, earphone jacks 57, and associated volume control knobs 59 encased in a padded enclosure 61. Within enclosure 61 is an amplifier (not shown) connected to speaker 55. At the input to the amplifier is earphone plug 63 which may be inserted into the earphone jack (not shown) on the TV set. Thus, in order not to disturb front seat passengers, plug 63 is plugged into the jack and knob 56 adjusted to the desired audio level. Should use of earphones be desired, three jacks 59 are provided which are connected to the speaker amplifier (connection not shown). Associated volume control knobs 59 are used so up to three rear seat passengers can listen at any desired volume without disturbing the other passengers. The various elements are encased within enclosure 61, which is well padded, for protection against bodily injury in an emergency stop or collision.

An adaptor socket 65 is used to provide power to the electrical devices. Plug 67, insertable into the cigarette lighter receptacle, provides 12 v DC to the adaptor. Jacks 69 and 71 receive plugs from the TV and VTR (not shown) which run on 12 v DC power. In addition, the amplifier for the speaker is connected (connection not shown) to adaptor 65.

In operation, support apparatus is secured in place on the automobile seat with the aid of bracket 11 and straps 13. Platform 15 is raised into a desired position by catching detentable hinge 43. A TV set, operable on DC power, is placed on platform 15 facing backward with its front edge abutting against rear stop plate 29. Then, front stop plate 27 is put into the appropriate ones of holes 28-32 to abut against the rear of the TV. Strap 31 is adjusted with buckle 38, and buckle 37 is then inserted into bracket 35. The VTR is placed on the front seat between holders 43 and suitably affixed thereto, as mentioned above. Strap 45 is secured around the VTR with suitable adjustment of buckle 51. The power cords of the TV and VTR are plugged into adaptor 65 and plug 67 is then plugged into the cigarette lighter receptable. The TV can then be turned on to receive off the air signals or connected to the VTR. The TV speaker can be used or, optionally, the sound devices provided in enclosure 61 can be activated.

It will be understood that although the preferred embodiment has been disclosed above various possible changes are readily apparent. For example, hinge 21 might be eliminated and a different arrangement for securing the TV and VTR could be utilized. These, and other such changes, are all included within the spirit and scope of the invention as defined by the following claims.

I claim:

1. An apparatus for use in the front seat of an automobile to support a television set utilized for rear seat viewing and associated devices comprising
    a frame shaped to fit over the backrest of said front seat, and having front, top and back portions with the front portion adapted to extend substantially to the cushion of said front seat;
    a platform hingedly fixed at one end to the top portion of said frame and its other end being extendable toward the front of the automobile;
    means attached to the front portion of said frame and the platform adapted to set the horizontal position of said platform;
    means to secure said television set to said platform,
    means at the lower end of the frame-bottom portion for securing a video playback means to the frame;
    a padded enclosure on the frame-back portion housing a plurality of earphone jacks and a rearward-facing speaker coupled to an amplifier, said amplifier being adapted for coupling to the audio circuit of said television set;
    a power source on the frame with a plug adapted for insertion into the automobile cigarette lighter; and
    said power source being adapted for coupling to the video playback means, the amplifier, and the television set.

2. The apparatus of claim 1, further comprising means for removably securing the frame to the front seat.

3. The apparatus of claim 1 wherein the means to secure the television set to the platform comprises a front stop plate and a back stop plate secured to the platform with at least one of said plates being movable to one of several fixed positions to thereby adjust the distance between said plates to the size of the television set.

* * * * *